US011506908B2

(12) United States Patent
Chen (10) Patent No.: US 11,506,908 B2
(45) Date of Patent: Nov. 22, 2022

(54) OPTICAL DEVICE

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 343 days.

(21) Appl. No.: 16/788,315

(22) Filed: Feb. 12, 2020

(65) Prior Publication Data

US 2020/0264445 A1 Aug. 20, 2020

(30) Foreign Application Priority Data

Feb. 15, 2019 (CN) .......................... 201920199894.X (51) Int. Cl.
*G03B 21/14* (2006.01)
*G02B 27/64* (2006.01)

(52) U.S. Cl.
CPC ........... *G02B 27/646* (2013.01); *G03B 21/14* (2013.01); *G03B 21/142* (2013.01); *G03B 21/145* (2013.01)

(58) Field of Classification Search
CPC ...... G03B 21/006; G03B 21/14; G03B 21/28; G03B 21/142; G03B 21/145; G03B 21/208; G03B 21/321; H04N 9/315; H04N 9/3141; H04N 9/3152; H04N 9/3155; G02B 27/026; G02B 27/095; G02B 27/0172; G02B 27/646; G02F 1/13332; G02F 1/133512; G02F 1/133308; G02F 1/133382; G02F 1/133385
See application file for complete search history.

(56) References Cited

U.S. PATENT DOCUMENTS

| | | | |
|---|---|---|---|
| 2004/0246398 A1* | 12/2004 | Kojima | G02F 1/133385 349/58 |
| 2006/0082695 A1* | 4/2006 | Miyashita | G02F 1/13452 349/58 |
| 2011/0194037 A1* | 8/2011 | Hirabayashi | G02F 1/133308 349/5 |
| 2017/0299883 A1* | 10/2017 | Nonaka | G03B 21/142 |
| 2018/0224692 A1* | 8/2018 | Miyashita | G02F 1/133385 |

FOREIGN PATENT DOCUMENTS

| | | |
|---|---|---|
| CN | 105467726 | 4/2016 |
| TW | 201816502 | 5/2018 |

* cited by examiner

*Primary Examiner* — Sultan Chowdhury
(74) *Attorney, Agent, or Firm* — JCIPRNET (57) ABSTRACT

An optical device including a holder and a light transmissive plate is provided. The holder includes a first frame and a second frame connected to each other, and the first frame is located inside the second frame. A light transmissive plate is disposed inside the first frame and has a surface. The first frame has at least one inner surface and includes at least one surface supporting part, and the surface supporting part extends along a direction from the inner surface of the first frame to the center of the first frame, and the surface of the light transmissive plate is at least partially supported by the surface supporting part of the first frame. The surface supporting part is non-continuously distributed along the inner surface of the first frame. The disclosure further provides a projector including the optical device.

17 Claims, 9 Drawing Sheets

OPTICAL DEVICE

CROSS-REFERENCE TO RELATED APPLICATION

This application claims the priority benefit of China application serial no. 201920199894.X, filed on Feb. 15, 2019. The entirety of the above-mentioned patent application is hereby incorporated by reference herein and made a part of this specification.

BACKGROUND

Technical Field

The disclosure relates to an optical device, and more particularly to an optical device that may be applied to a projector.

Description of Related Art

A projection device is a display device for generating an image. An illumination beam generated by a light source may be converted into an image beam by a light valve in the projection device, and then the image beam may be projected onto a screen or a wall by the projection lens.

The resolution of the image converted by the light valve has gradually failed to meet the market demand. In order to further improve the image resolution, a high-resolution light valve may be used in the projection device, but this will cause the projection device to be expensive in cost. In addition, in some projection devices, an optical module that can be optically vibrated may be additionally disposed to further enhance the resolution of the image converted by the light valve. The optical module includes a frame and a light transmissive plate disposed on the frame, and a peripheral region of the surface of the light transmissive plate is supported by the frame. In this disposition, when the frame and the light transmissive plate vibrate, impact or tapping may occur between the surface of the light transmissive plate and the frame, thereby causing unpleasant noise.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides an optical device which can reduce or eliminate the noise generated during its operation.

Other objects and advantages of the disclosure may be further understood from the technical features disclosed in the disclosure.

In order to achieve one or a part or all of the above or other objects, an embodiment of the disclosure provides an optical device including a holder and a light transmissive plate. The holder includes a first frame and a second frame connected to each other, and the first frame is located inside the second frame. The light transmissive plate is disposed inside the first frame and has a surface. The first frame has at least one inner surface and includes at least one surface supporting part, and the at least one surface supporting part extends along a direction from the at least one inner surface of the first frame to the center of the first frame, and the surface of the light transmissive plate is at least partially supported by the at least one surface supporting part of the first frame. The at least one surface supporting part is non-continuously distributed along the at least one inner surface of the first frame.

In order to achieve one or a part or all of the above or other objects, an embodiment of the disclosure provides a projector including the above optical device. The optical device includes a holder and a light transmissive plate. The holder includes a first frame and a second frame connected to each other, and the first frame is located inside the second frame. The light transmissive plate is disposed inside the first frame and has a surface. The first frame has at least one inner surface and includes at least one surface supporting part, and the at least one surface supporting part extends along a direction from the at least one inner surface of the first frame to the center of the first frame, and the surface of the light transmissive plate is at least partially supported by the at least one surface supporting part of the first frame. The at least one surface supporting part is non-continuously distributed along the at least one inner surface of the first frame.

Based on the above, the embodiments of the disclosure have at least one of the following advantages or effects. By disposing the surface supporting part of the first frame to be non-continuously distributed along the inner surface of the first frame, the light transmissive plate can be non-continuously supported by the surface supporting part. That is, the area of the light transmissive plate touched with and supported by the first frame can be decreased. In this way, when the first frame and the light transmissive plate vibrate, the impact area or the tapping area between the surface of the light transmissive plate and the first frame is decreased, whereby the noise generated during the operation of the optical device can be reduced or eliminated.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
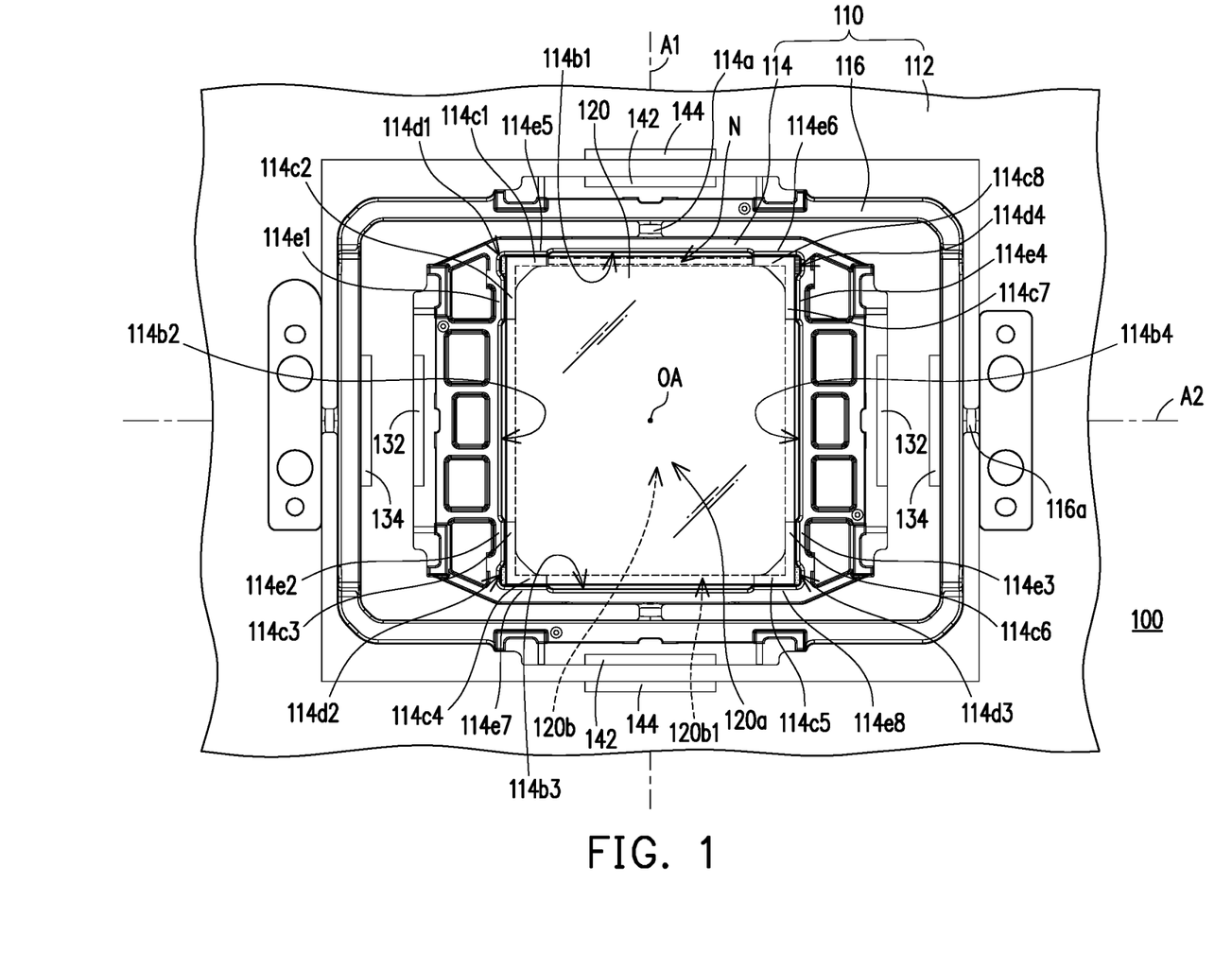
FIG. 1 is a schematic view of an optical device according to an embodiment of the disclosure.

FIG. 1 is a schematic view of an optical device according to an embodiment of the disclosure. With reference to FIG. 1, an optical device 100 of the embodiment includes a holder 110 and a light transmissive plate 120. The holder 110 includes a base 112, a first frame 114 and a second frame 116. The first frame 114 and the second frame 116 are connected by at least one connection part 114a, and the first frame 114 is located inside the second frame 116. The second frame 116 and the base 112 are connected by at least one connection part 116a, and the second frame 116 is located inside the base 112. The first frame 114 may be reciprocally deflected relative to the second frame 116 with respect to a first rotation axis A1 by elastic deformation of the connection part 114a, and the second frame 116 and the first frame 114 therein may be reciprocally deflected relative to the base 112 with respect to a second rotation axis A2 by elastic deformation of the connection part 116a. The first axis A1 and the second axis A2 are, for example, perpendicular to each other, and the first axis A1 and the second axis A2 are, for example, both perpendicular to an optical axis OA of the light transmissive plate 120. In other embodiments, the first axis A1 and the second axis A2 are not necessarily perpendicular. For example, in another embodiment, the angle between the first axis A1 and the second axis A2 is an acute angle. In the embodiment, the holder 110 may be made of a resin material (such as rubber, plastic, etc.) or a metal material (such as aluminum, titanium, etc.). However, the disclosure is not limited to the above. In other embodiments, the holder 110 may be made of other suitable materials.

The light transmissive plate 120 is disposed inside the first frame 114 and may vibrate due to the reciprocal deflection of the first frame 114. The light transmissive plate 120 has two opposite surfaces 120a and 120b. The two surfaces 120a and 120b are, for example, respectively a light incident surface and a light emitting surface of the light transmissive plate 120 and are perpendicular to the optical axis OA of the light transmissive plate 120. The first frame 114 has at least one inner surface parallel to the optical axis OA (for example, a first inner surface 114b1, a second inner surface 114b2, a third inner surface 114b3, and a fourth inner surface 114b4 are illustrated) and includes at least one surface supporting part (for example, a first surface supporting part 114c1, a second surface supporting part 114c2, a third surface supporting part 114c3, a fourth surface supporting part 114c4, a fifth surface supporting part 114c5, a sixth surface supporting part 114c6, a seventh surface supporting part 114c7, and an eighth surface supporting part 114c8 are illustrated). In an embodiment, the light transmissive plate 120 may be, for example, glass. For example, it may be a glass plate having a thickness of less than or equal to 5 mm. The material of the light transmissive plate 120 includes various glass materials such as borosilicate glass, quartz glass, etc. In other embodiments, the light transmissive plate 120 includes a material which may have a light transmittance value in a preferable range and may refract light, like various crystalline materials such as crystal, sapphire, etc. In other embodiments, the light transmissive plate 120 may be made of other suitable materials, such as optical plastic materials with high temperature resistance.

In some embodiments, the first surface supporting part 114c1 and the eighth surface supporting part 114c8 extend along a direction from the first inner surface 114b1 of the first frame 114 to the center of the first frame 114 (such as the location of the optical axis OA). The second surface supporting part 114c2 and the third surface supporting part 114c3 extend along a direction from the second inner surface 114b2 of the first frame 114 to the center of the first frame 114 (such as the location of the optical axis OA). The fourth surface supporting part 114c4 and the fifth surface supporting part 114c5 extend along a direction from the third inner surface 114b3 of the first frame 114 to the center of the first frame 114 (such as the location of the optical axis OA). The sixth surface supporting part 114c6 and the seventh surface supporting part 114c7 extend along a direction from the fourth inner surface 114b4 of the first frame 114 to the center of the first frame 114 (such as the location of the optical axis OA). In the embodiment, each of the at least one inner surfaces 114b1, 114b2, 114b3 and 114b4 of the first frame 114 is provided with a surface supporting part. However, the disclosure is not limited to the above. For example, in other embodiments, one or more of the at least one inner surfaces 114b1, 114b2, 114b3 and 114b4 of the first frame 114 are not necessarily provided with any surface supporting part. At least a part of a peripheral region 120b1 of the surface 120b of the light transmissive plate 120 is positioned to be aligned with and supported by the surface supporting parts 114c1 to 114c8 of the first frame 114 along a direction parallel to the optical axis OA.

In the embodiment, the surface supporting parts 114c1 to 114c8 are non-continuously distributed along the inner surfaces 114b1 to 114b4 of the first frame 114. In this way, the light transmissive plate 120 can be non-continuously supported by the surface supporting parts 114c1 to 114c8. That is, the area of the light transmissive plate 120 touched with and supported by the first frame 114 can be decreased. In this way, when the first frame 114 and the light transmissive plate 120 vibrate, the impact area or the tapping area between the surface 120b of the light transmissive plate 120 and the first frame 114 is decreased, whereby the noise generated during the operation of the optical device 100 can be reduced or eliminated.

In the embodiment, the first frame 114 is connected to the base 112 via the second frame 116 as described above, but the disclosure is not limited thereto. In other embodiments, the second frame 116 is not necessarily disposed, and the first frame 114 is directly connected to the base 112. In addition, the optical device 100 of the embodiment is, for example, configured to be disposed on a transmission path of an image beam between a light valve and a projection lens of the projector to improve the resolution of the image beam based on optical vibration technology. In other embodiments, the optical device 100 may be applied to other types of devices, and the disclosure is not limited to this.

Regarding the first frame 114 of the embodiment, taking the connection portion between the first inner surface 114b1 and the second inner surface 114b2 adjacent to each other as an example, the first surface supporting part 114c1 on the first inner surface 114b1 is formed integrally with the second surface supporting part 114c2 on the second inner surface 114b2. In this embodiment, the first surface supporting part 114c1 and the second surface supporting part 114c2 formed integrally may be substantially L-shaped, for example, and the transition corner of the L-shaped supporting structure may be a right-angled corner or a smooth corner. Optionally or additionally, the third surface supporting part 114c3 and the fourth surface supporting part 114c4, the fifth surface supporting part 114c5 and the sixth surface supporting part 114c6, and the seventh surface supporting part 114c7 and the eighth surface supporting part 114c8 may also be respectively configured in the same way to be substantially L-shaped, for example. In other embodiments, the surface supporting parts may be in other shapes, and the disclosure does not pose limitation on this.

In the embodiment, a notch N is formed between the first surface supporting part 114c1 and the eighth surface supporting part 114c8, and another part (i.e., a part not supported by the surface supporting parts) of the peripheral region 120b1 of the surface 120b of the light transmissive plate 120 is positioned to be aligned with the notch N. Similarly, a notch may be formed, for example, between the second surface supporting part 114c2 and the third surface supporting part 114c3, between the fourth surface supporting part 114c4 and the fifth surface supporting part 114c5, and between the sixth surface supporting part 114c6 and the seventh surface supporting part 114c7, respectively. With the notches, the light transmissive plate 120 can be non-continuously touched with and supported by the surface supporting parts 114c1 to 114c8 as described above.

Further, taking the first inner surface 114b1 as an example, the length of the notch N is greater than the length of any of the surface supporting parts 114c1 and 114c8. That is, the surface supporting parts 114c1 and 114c8 have smaller lengths so that the area where the light transmissive plate 120 is touched with and supported by the surface supporting parts 114c1 and 114c8 is smaller, and the impact area or the tapping area between the surface 120b of the light transmissive plate 120 and the first frame 114 is decreased as much as possible. In the embodiment, the surface supporting parts 114c2 and 114c3, the surface supporting parts 114c4 and 114c5, and the surface supporting parts 114c6 and 114c7 may be respectively disposed in a way similar to the surface supporting parts 114c1 and 114c8. However, the disclosure is not limited to the above. For example, in other embodiments, taking the surface supporting parts 114c2 and 114c3 as examples, the lengths of the surface supporting parts 114c2 and 114c3 may be different, and the length of the surface supporting part 114c2 or 114c3 may be greater than or equal to the length of the notch between them.

In the embodiment, for example, the first frame 114 includes four inner surfaces 114b1 to 114b4, and four corners are formed by the four inner surfaces 114b1 to 114b4. The surface supporting parts 114c1 to 114c8 may be respectively located at the four corners. In the embodiment, for example, the surface supporting parts 114c1 and 114c2 may be located at one of the four corners. Further, the first surface supporting part 114c1 and the second surface supporting part 114c2 formed integrally and substantially L-shaped may be located at one of the four corners. However, in other embodiments, the surface supporting parts are not necessarily formed at the corners of the first frame, and the disclosure does not limit the positions of the surface supporting parts.

In addition, the first frame 114 of the embodiment has side limiting protrusions 114e1 and 114e2 on the second inner surface 114b2, side limiting protrusions 114e3 and 114e4 on the fourth inner surface 114b4, side limiting protrusions 114e5 and 114e6 on the first inner surface 114b1, and side limiting protrusions 114e7 and 114e8 on the third inner surface 114b3. In the embodiment, each of the at least one inner surfaces 114b1, 114b2, 114b3 and 114b4 of the first frame 114 is provided with side limiting protrusions. However, the disclosure is not limited to the above. For example, in other embodiments, one or more of the at least one inner surfaces 114b1, 114b2, 114b3 and 114b4 of the first frame 114 are not necessarily provided with any side limiting protrusion. In the embodiment, the side limiting protrusions 114e1 and 114e2 of the first frame 114 are respectively positioned to be aligned with (opposing or corresponding to) the surface supporting parts 114c2 and 114c3. The side limiting protrusions 114e3 and 114e4 are respectively positioned to be aligned with the surface supporting parts 114c6 and 114c7. The side limiting protrusions 114e5 and 114e6 are respectively positioned to be aligned with the surface supporting parts 114c1 and 114c8. The side limiting protrusions 114e7 and 114e8 are respectively positioned to be aligned with the surface supporting parts 114c4 and 114c5. However, the disclosure is not limited to the above. In other embodiments, for example, on the second inner surface 114b2, the positions of the side limiting protrusions 114e1 and 114e2 are not necessarily corresponding to the positions of the surface supporting parts 114c2 and 114c3. For example, the side limiting protrusion 114e1, the surface supporting part 114c2, the side limiting protrusion 114e2, and the surface supporting part 114c3 are spaced apart along the second inner surface 114b2. In the embodiment, two opposite sides of the light transmissive plate 120 are respectively limited in position by the side limiting protrusions 114e1 and 114e2 and the side limiting protrusions 114e3 and 114e4, and the other two opposite sides of the light transmissive plate 120 are respectively limited in position by the side limiting protrusions 114e5 and 114e6 and the side limiting protrusions 114e7 and 114e8. In other embodiments, the side limiting protrusions 114e1 to 114e8 may be formed at other positions on the inner surfaces of the first frame 114, or side limiting protrusions are not necessarily formed on the inner surfaces of the first frame 114. The disclosure does not pose limitation on this.

The first frame 114 of the embodiment has at least one dispensing groove (shown as dispensing grooves 114d1 to 114d4) for accommodating adhesive glue. The dispensing grooves 114d1 to 114d4 may be located, for example, at the four corners of the first frame 114, respectively. In the embodiment, the dispensing grooves 114d1 and 114d2 may extend from the second inner surface 114b2 of the first frame 114 in a direction away from the center of the first frame 114 (such as the location of the optical axis OA), for example depressed on the second inner surface 114b2 of the first frame 114. The dispensing grooves 114d3 and 114d4 extend from the fourth inner surface 114b4 of the first frame 114 in a direction away from the center of the first frame 114 (such as the location of the optical axis OA), for example depressed on the second inner surface 114b2 of the first frame 114. However, the disclosure is not limited to the above. For example, in other embodiments, the dispensing grooves 114d1, 114d2, 114d3 and 114d4 may be depressed on different ones of the at least one inner surfaces 114b1 to 114b4 in a direction away from the center of the first frame 114, respectively. In one embodiment, the surface 120b of the light transmissive plate 120 is adhered to the first frame 114 by the glues dispensed into the dispensing grooves 114d1 to 114d4. In the embodiment shown in FIG. 1, the at least one inner surface of the first frame 114 is four (114b1 to 114b4) in number and forms four corners. The at least one surface supporting parts (114c1 to 114c8) form four L-shaped supporting structures, and the four L-shaped supporting structures are respectively located at the four corners. In the embodiment, the at least one dispensing grooves 114d1 to 114d4 are respectively positioned to be aligned with the four L-shaped supporting structures. However, the disclosure is not limited to the above. In other embodiments, the at least one dispensing grooves 114d1 to 114d4 may include a dispensing groove aligned with the L-shaped supporting structure and a dispensing groove not aligned with the L-shaped supporting structure. In other embodiments, the light transmissive plate 120 may be fixed to the first frame 114 in other suitable ways, and the disclosure does not pose limitation on this.

The way to drive the first frame 114 and the second frame 116 to vibrate in the embodiment will be described below. The optical device 100 of the embodiment further includes at least one first driving element 132 (shown as two), at least one second driving element 134 (shown as two), at least one third driving element 142 (shown as two), and at least one fourth driving element 144 (shown as two). The first driving element 132 is disposed on the first frame 114, and the second driving element 134 is positioned to be aligned with the first driving element 132, so that the first frame 114 may be deflected by the magnetic force between the first driving element 132 and the second driving element 134. Similarly, the third driving element 142 is disposed on the second frame 116, and the fourth driving element 144 is positioned to be aligned with the third driving element 142, so that the second frame 116 may be deflected by the magnetic force between the third driving element 142 and the fourth driving element 144. Specifically, the first driving element 132 and the third driving element 142 are, for example, a coil or a magnet, and the second driving element 134 and the fourth driving element 144 are, for example, the other one of the coil and the magnet. However, in other embodiments, the first driving element 132 and the second driving element 134 are interchangeable in positions. In another embodiment, the third driving element 142 and the fourth driving element 144 are interchangeable in positions. In a further embodiment, the optical device may include a set of driving elements (the first driving element 132 and the second driving element 134, or the third driving element 142 and the fourth driving element 144).

Figure 2:
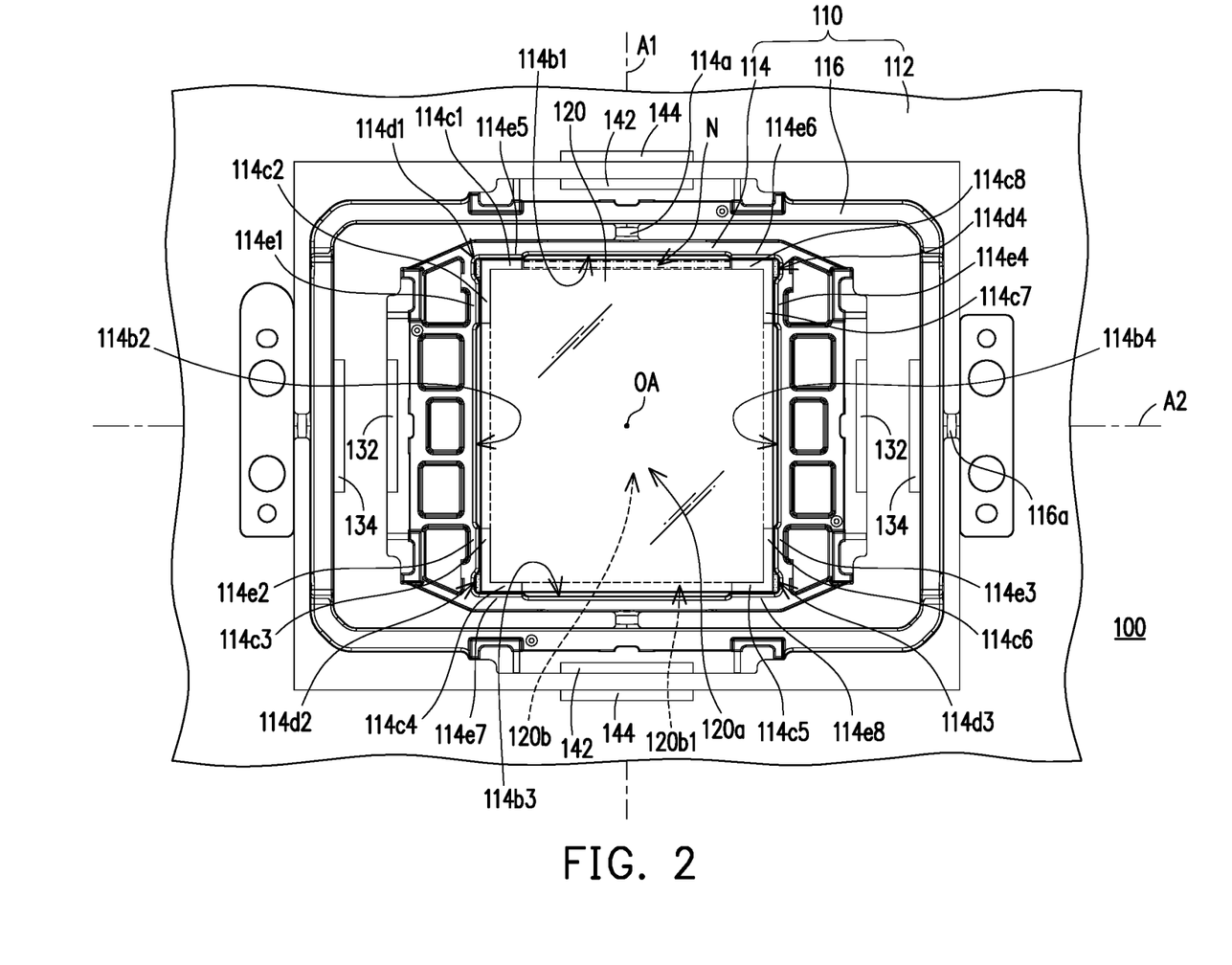
FIG. 2 is a schematic view of an optical device according to another embodiment of the disclosure.

FIG. 2 is a schematic view of an optical device according to another embodiment of the disclosure. The difference between the embodiment shown in FIG. 2 and the embodiment shown in FIG. 1 is that: each of the L-shaped supporting structures formed by the surface supporting parts 114c1 to 114c8 in FIG. 1 has a smooth corner or a rounded corner at the transition corner, while each of the L-shaped supporting structures formed by the surface supporting parts 114c1 to 114c8 shown in FIG. 2 has a right-angled corner at the transition corner. However, in other embodiments, each of the L-shaped supporting structures formed by the surface supporting parts 114c1 to 114c8 includes an L-shaped supporting structure with a smooth corner or a rounded corner at the transition corner and an L-shaped supporting structure with a right-angled corner at the transition corner.

Figure 3:
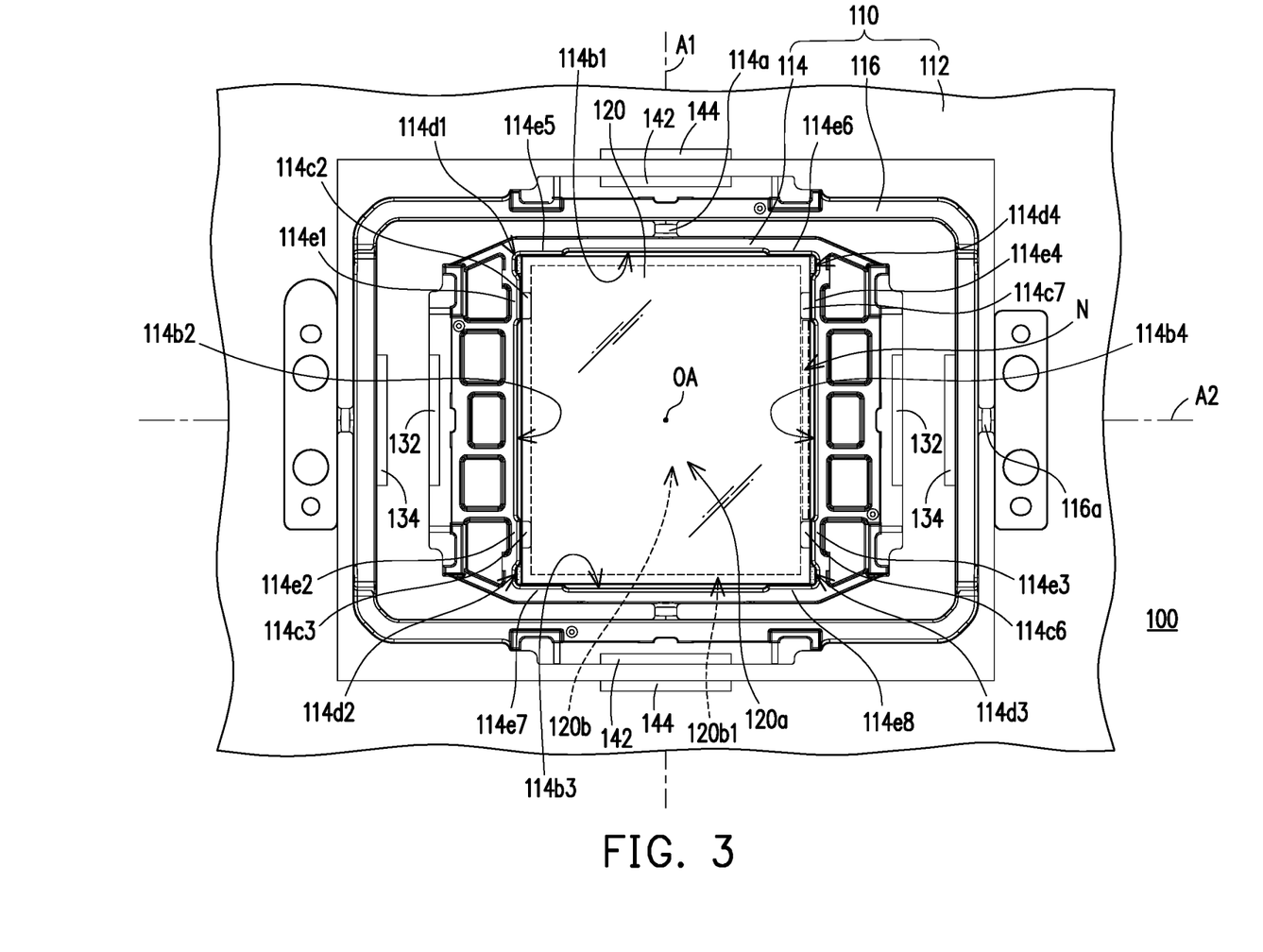
FIG. 3 is a schematic view of an optical device according to another embodiment of the disclosure.

FIG. 3 is a schematic view of an optical device according to another embodiment of the disclosure. The difference between the embodiment shown in FIG. 3 and the embodiment shown in FIG. 1 is that the first frame 114 in FIG. 3 has surface supporting parts 114c2, 114c3, 114c6 and 114c7 only on the second inner surface 114b2 and the fourth inner surface 114b4, and does not have surface supporting parts on the first inner surface 114b1 and the third inner surface 114b3.

Figure 4:
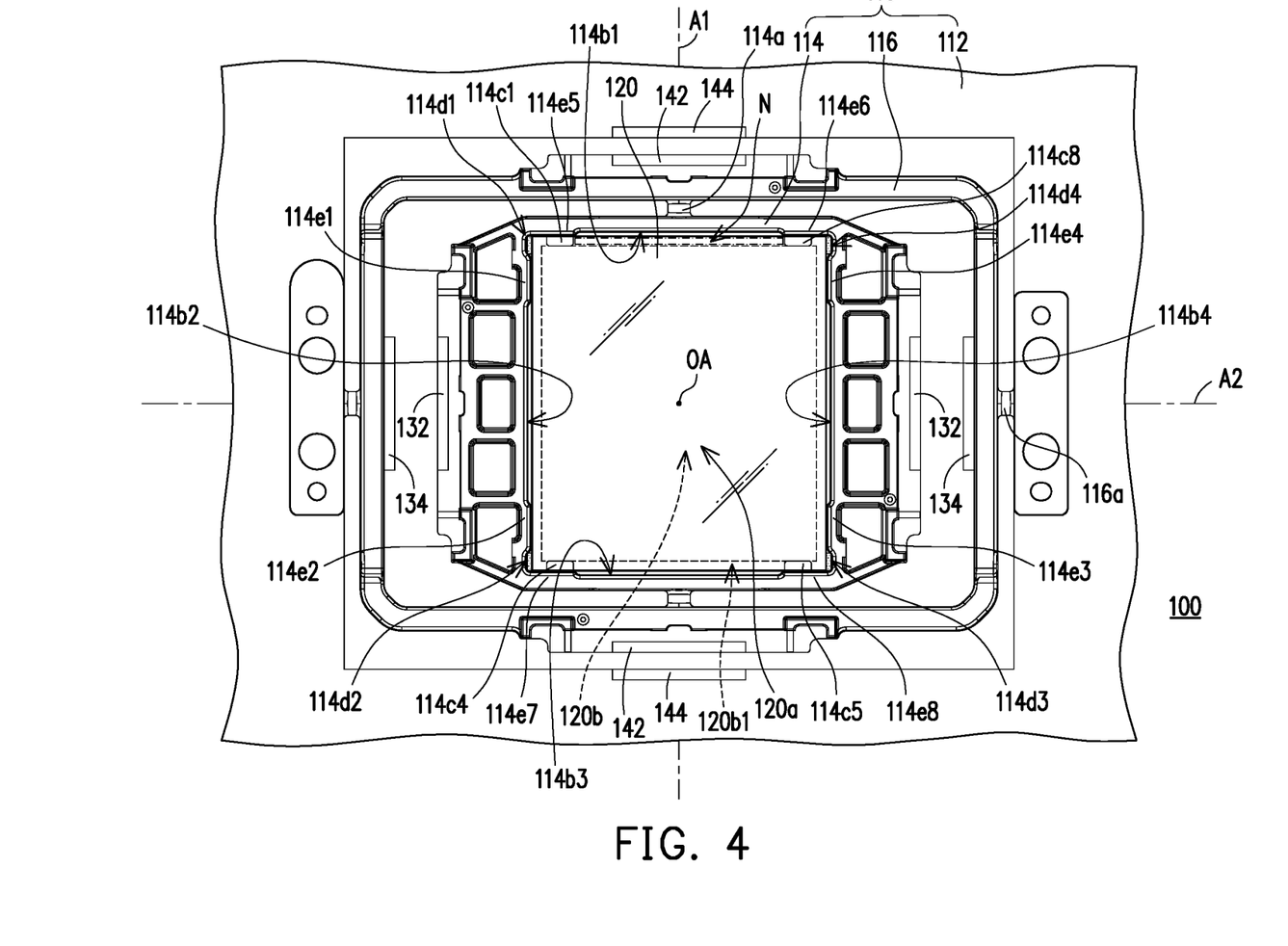
FIG. 4 is a schematic view of an optical device according to another embodiment of the disclosure.

FIG. 4 is a schematic view of an optical device according to another embodiment of the disclosure. The difference between the embodiment shown in FIG. 4 and the embodiment shown in FIG. 1 is that the first frame 114 in FIG. 4 has surface supporting parts 114c1, 114c4, 114c5 and 114c8 only on the first inner surface 114b1 and the third inner surface 114b3, and does not have surface supporting parts on the first inner surface 114b1 and the third inner surface 114b3 thereof.

Figure 5:
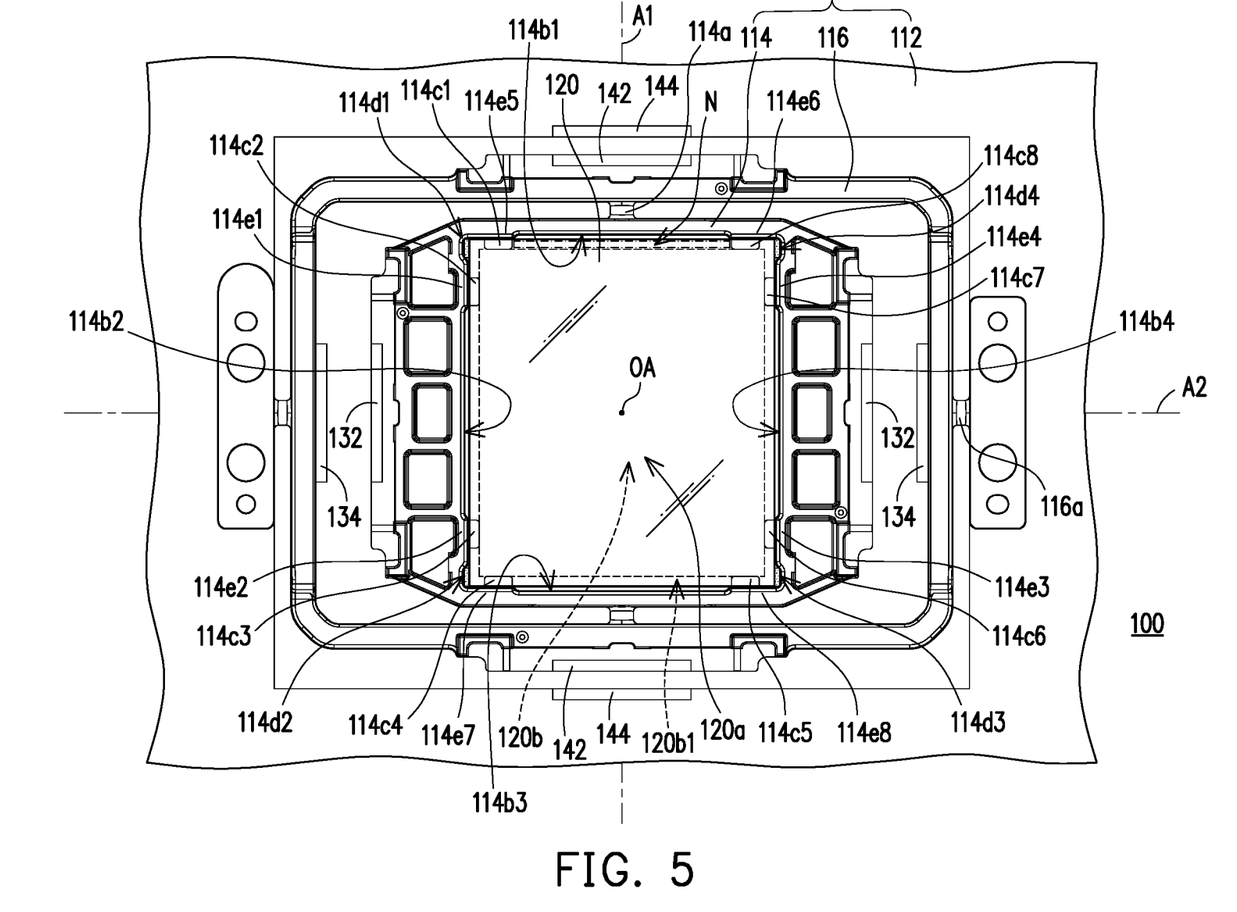
FIG. 5 is a schematic view of an optical device according to another embodiment of the disclosure.

FIG. 5 is a schematic view of an optical device according to another embodiment of the disclosure. The difference between the embodiment shown in FIG. 5 and the embodiment shown in FIG. 1 is that the surface supporting parts 114c1 to 114c8 in FIG. 5 are not configured to form a plurality of substantially L-shaped supporting structures, and the surface supporting parts 114c1 to 114c8 are separated from each other and are disposed apart. In other embodiments, at least two of the surface supporting parts 114c1 to 114c8 may generally be configured to form an L-shaped supporting structure, and the others may be separated from each other and be disposed apart.

Figure 6:
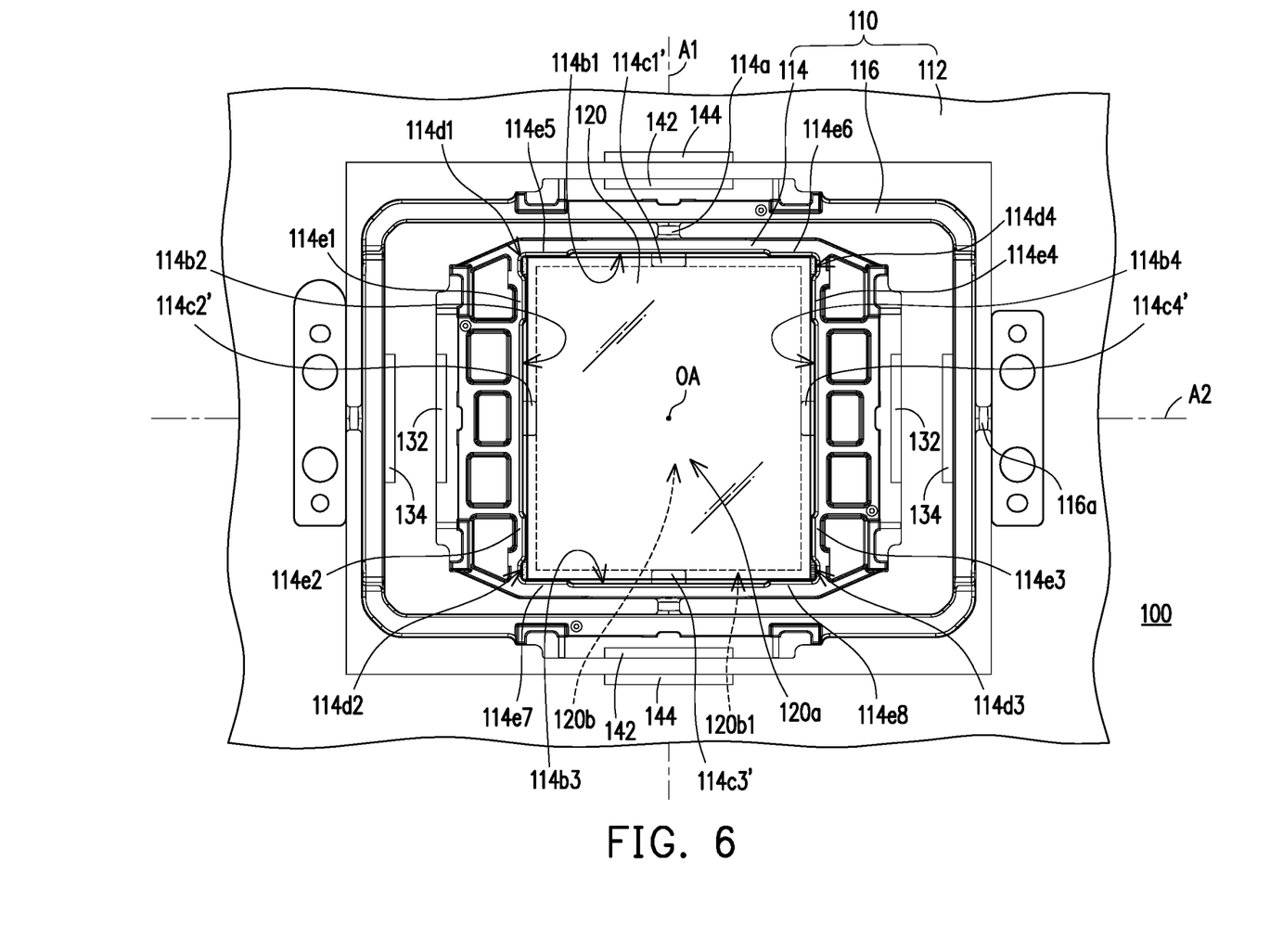
FIG. 6 is a schematic view of an optical device according to another embodiment of the disclosure.

FIG. 6 is a schematic view of an optical device according to another embodiment of the disclosure. The difference between the embodiment shown in FIG. 6 and the embodiment shown in FIG. 1 is that the four corners of the first frame 114 shown in FIG. 6 are not provided with surface supporting parts. Instead, surface supporting parts 114c1' to 114c4' are provided at intermediate sections of the inner surfaces 114b1 to 114b4 of the first frame 114. In other embodiments, the first frame 114 is not necessarily provided with a surface supporting part, and the light transmissive plate 120 may be limited by the side limiting protrusions (such as the side limiting protrusions 114e1 to 114e8) on the inner surfaces 114b1 to 114b4 of the first frame 114 and be supported by these side limiting protrusions.

Figure 7:
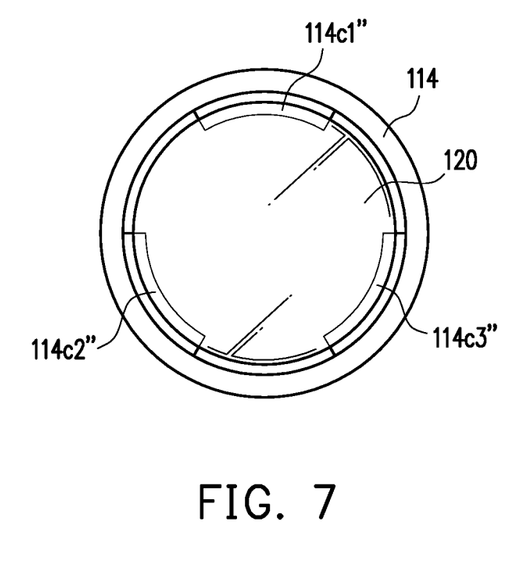
FIG. 7 is a schematic view of a first frame and a light transmissive plate according to another embodiment of the disclosure.

FIG. 7 is a schematic view of a first frame and a light transmissive plate according to another embodiment of the disclosure. The difference between the embodiment shown in FIG. 7 and the embodiment shown in FIG. 1 is that the first frame 114 and the light transmissive plate 120 shown in FIG. 7 are substantially circular, and the surface supporting parts 114c1" to 114c3" are spaced and evenly arranged on the inner surface of the first frame 114. In other embodiments, the first frame 114 and the light transmissive plate 120 may be in other shapes, and the disclosure does not pose limitation on this. In the embodiment shown in FIG. 7, the first frame 114 may also include side limiting protrusions (not shown).

Figure 8:
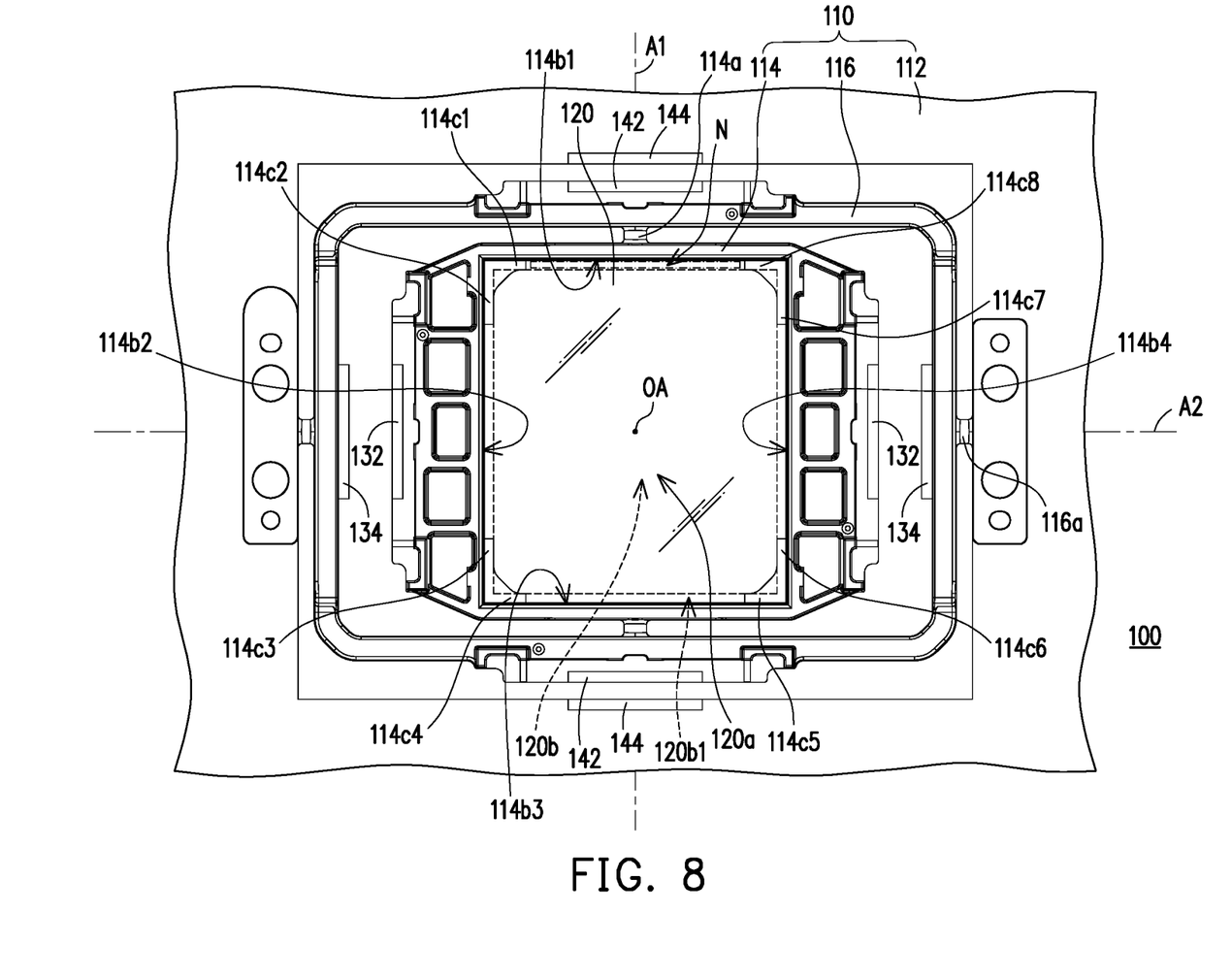
FIG. 8 is a schematic view of an optical device according to another embodiment of the disclosure.

FIG. 8 is a schematic view of an optical device according to another embodiment of the disclosure. The difference between the embodiment shown in FIG. 8 and the embodiment shown in FIG. 1 is that the first frame 114 in FIG. 8 does not have side limiting protrusions 114e1 to 114e8, and sides of the light transmissive plate 120 is directly limited by the inner surfaces 114b1 to 114b4 of the first frame 114. In the embodiment shown in FIG. 8, the dispensing groves 114d1 to 114d4 may also be included (not shown in FIG. 8).

Figure 9:
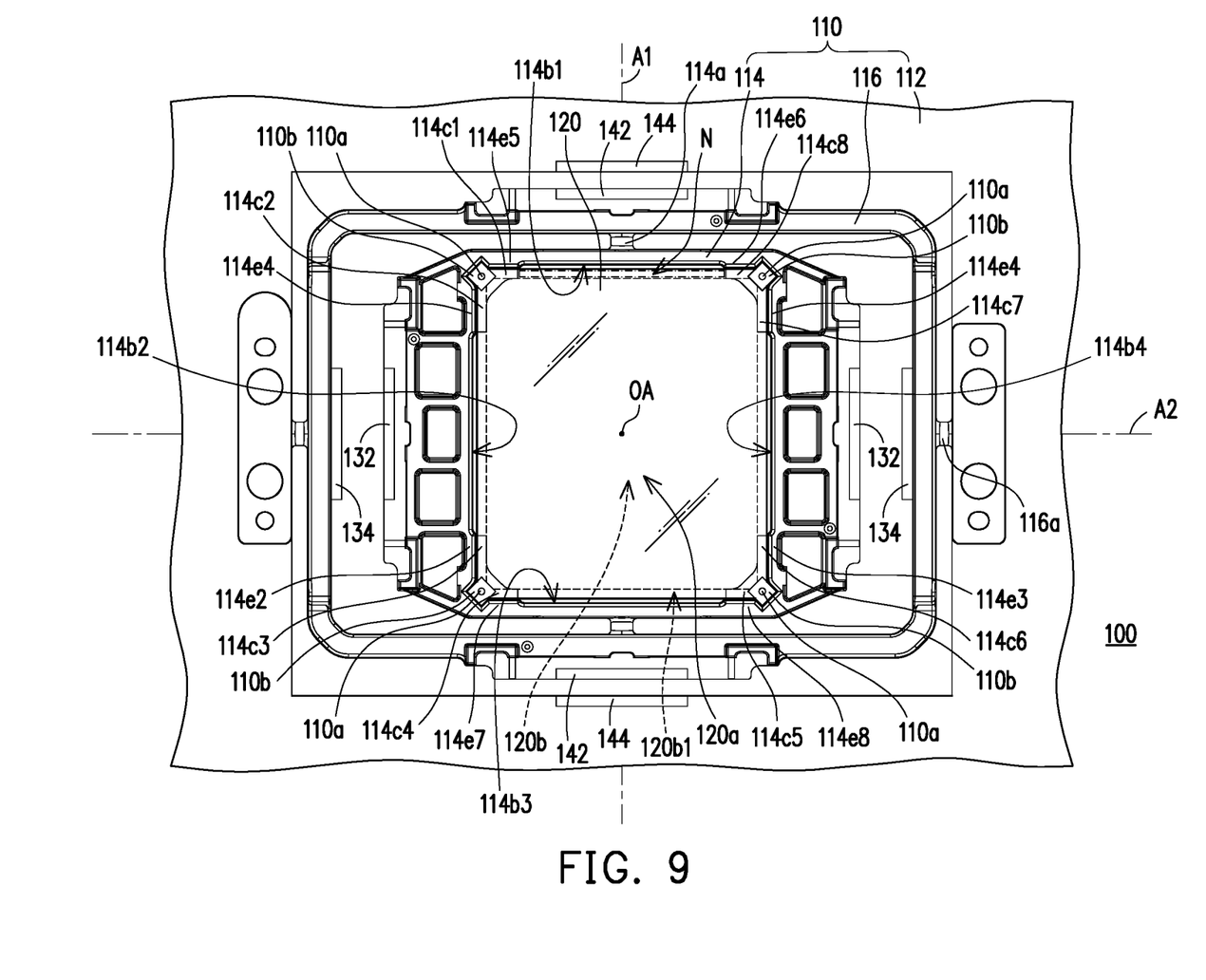
FIG. 9 is a schematic view of an optical device according to another embodiment of the disclosure.

FIG. 9 is a schematic view of an optical device according to another embodiment of the disclosure. The difference between the embodiment shown in FIG. 9 and the embodiment shown in FIG. 1 is that the holder 110 in FIG. 9 is used to fix the light transmissive plate 120 by way of clamping it with sheet-shaped springs instead of by gluing. Specifically, the holder 110 shown in FIG. 9 further includes at least one fixture 110a (shown as four) and at least one sheet-shaped spring 110b (shown as four), and the fixtures 110a are used to lock the sheet-shaped springs 110b onto the first frame 114, and the light transmissive plate 120 is clamped between the sheet-shaped springs 110b and the first frame 114. In the embodiment shown in FIG. 9, the fixtures 110a are used to lock the sheet-shaped springs 110b at the four corners of the first frame 114. Correspondingly, the four corners of the light transmissive plate 120 may have chamfers to bypass the locking positions of the fixtures 110a. However, the disclosure is not limited thereto.

In summary, the embodiments of the disclosure have at least one of the following advantages or effects. By disposing the surface supporting parts of the first frame to be non-continuously distributed along the inner surfaces of the first frame, the light transmissive plate can be non-continuously supported by the surface supporting parts. That is, the area of the light transmissive plate touched with and supported by the first frame may be decreased. In this way, when the first frame and the light transmissive plate vibrate, the impact area or the tapping area between the surface of the light transmissive plate and the first frame is decreased, whereby the noise generated during the operation of the optical device can be reduced or eliminated.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical device comprising a holder and a light transmissive plate, wherein
   the holder comprises a first frame and a second frame connected to each other, and the first frame is located inside the second frame, and
   the light transmissive plate is disposed inside the first frame, and the light transmissive plate has a surface,
   wherein the first frame has at least one inner surface and comprises at least one surface supporting part, the at least one surface supporting part extends along a direction from the at least one inner surface of the first frame towards a center of the first frame, and the surface of the light transmissive plate is at least partially supported by the at least one surface supporting part of the first frame,
   wherein the at least one surface supporting part is non-continuously distributed along the at least one inner surface of the first frame,
   wherein the at least one inner surface of the first frame comprises a first inner surface and a second inner surface adjacent to each other, wherein the at least one surface supporting part comprises a first surface supporting part on the first inner surface and a second surface supporting part on the second inner surface, and wherein the first surface supporting part is formed integrally with the second surface supporting part.

2. The optical device of claim 1, wherein the surface of the light transmissive plate comprises a peripheral region, and a part of the peripheral region is positioned to be aligned with and supported by the at least one surface supporting part.

3. The optical device of claim 1, wherein the first surface supporting part and the second surface supporting part are positioned to form an L-shaped structure.

4. The optical device of claim 1, wherein the first frame has at least one dispensing groove for accommodating a glue, the at least one dispensing groove extends along a direction from the at least one inner surface of the first frame away from the center of the first frame, and the surface of the light transmissive plate is adhered to the first frame by the glue in the at least one dispensing groove.

5. The optical device of claim 4, wherein the at least one inner surface of the first frame is four in number and forms four corners, the at least one surface supporting part is four in number, and the four surface supporting parts are respectively located at the four corners, wherein the at least one dispensing groove is positioned to be aligned with the four surface supporting parts.

6. The optical device of claim 1, wherein the holder comprises at least one fixture and at least one sheet-shaped spring, the at least one fixture is used to lock the at least one sheet-shaped spring to the first frame, and the light transmissive plate is clamped between the at least one sheet-shaped spring and the first frame.

7. The optical device of claim 1, wherein the surface of the light transmissive plate is a light incident surface of the light transmissive plate or a light emitting surface of the light transmissive plate.

8. The optical device of claim 1, wherein the holder further comprises a base, and the first frame is connected to the base via the second frame, wherein the first frame is deflected relative to the second frame with respect to a first rotation axis, and the second frame is deflected relative to the base with a second axis.

9. The optical device of claim 8, wherein the optical device comprises at least one first driving element and at least one second driving element, wherein the at least one first driving element and the at least one second driving element are respectively disposed on the first frame and the second frame, and the first frame is deflected relative to the second frame by the at least one first driving element and the at least one second driving element.

10. The optical device of claim 9, wherein one of the at least one first driving element and the at least one second driving element is a coil, and the other of the at least one first driving element and the at least one second driving element is a magnet.

11. The optical device of claim 8, wherein the holder has at least one connection part, the first frame and the second frame are connected via the at least one connection part, and the first frame is reciprocally rotated relative to the second frame by elastic deformation of the at least one connection part.

12. An optical device comprising a holder and a light transmissive plate, wherein
the holder comprises a first frame and a second frame connected to each other, and the first frame is located inside the second frame, and
the light transmissive plate is disposed inside the first frame, and the light transmissive plate has a surface,
wherein the first frame has at least one inner surface and comprises at least one surface supporting part, the at least one surface supporting part extends along a direction from the at least one inner surface of the first frame towards a center of the first frame, and the surface of the light transmissive plate is at least partially supported by the at least one surface supporting part of the first frame,
wherein the at least one surface supporting part is non-continuously distributed along the at least one inner surface of the first frame,
wherein the surface of the light transmissive plate comprises a peripheral region, and a part of the peripheral region is positioned to be aligned with and supported by the at least one surface supporting part, and
wherein the at least one surface supporting part comprises at least two surface supporting parts on one of the at least one inner surface, a notch is formed between the at least two surface supporting parts, and another part of the peripheral region is positioned to be aligned with the notch.

13. The optical device of claim 12, wherein a length of the notch is greater than a length of any of the at least two surface supporting parts.

14. An optical device comprising a holder and a light transmissive plate, wherein
the holder comprises a first frame and a second frame connected to each other, and the first frame is located inside the second frame, and
the light transmissive plate is disposed inside the first frame, and the light transmissive plate has a surface,
wherein the first frame has at least one inner surface and comprises at least one surface supporting part, the at least one surface supporting part extends along a direction from the at least one inner surface of the first frame towards a center of the first frame, and the surface of the light transmissive plate is at least partially supported by the at least one surface supporting part of the first frame,
wherein the at least one surface supporting part is non-continuously distributed along the at least one inner surface of the first frame, and
wherein the at least one inner surface of the first frame is four in number and forms four corners, wherein the at least one surface supporting part is respectively located at the four corners.

15. The optical device of claim 14, wherein the four surface supporting parts are L-shaped.

16. An optical device comprising a holder and a light transmissive plate, wherein
the holder comprises a first frame and a second frame connected to each other, and the first frame is located inside the second frame, and
the light transmissive plate is disposed inside the first frame, and the light transmissive plate has a surface,
wherein the first frame has at least one inner surface and comprises at least one surface supporting part, the at least one surface supporting part extends along a direction from the at least one inner surface of the first frame towards a center of the first frame, and the surface of the light transmissive plate is at least partially supported by the at least one surface supporting part of the first frame,
wherein the at least one surface supporting part is non-continuously distributed along the at least one inner surface of the first frame, and
wherein the at least one inner surface of the first frame comprises a first inner surface and a second inner surface adjacent to each other, wherein the first inner surface has a surface supporting part thereon, and the second inner surface does not have a surface supporting part thereon.

17. A projector comprising an optical device, the optical device comprising a holder and a light transmissive plate, wherein
the holder comprises a first frame and a second frame connected to each other, and the first frame is located inside the second frame, and the light transmissive plate is disposed inside the first frame, and the light transmissive plate has a surface, wherein the first frame has at least one inner surface and comprises at least one surface supporting part, the at least one surface supporting part extends along a direction from the at least one inner surface of the first frame towards a center of the first frame, and the surface of the light transmissive plate is at least partially supported by the at least one surface supporting part of the first frame, wherein the at least one surface supporting part is non-continuously distributed along the at least one inner surface of the first frame, wherein the at least one inner surface of the first frame comprises a first inner surface and a second inner surface adjacent to each other, wherein the at least one surface supporting part comprises a first surface supporting part on the first inner surface and a second surface supporting part on the second inner surface, and wherein the first surface supporting part is formed integrally with the second surface supporting part.

* * * * *